Patented Aug. 12, 1930

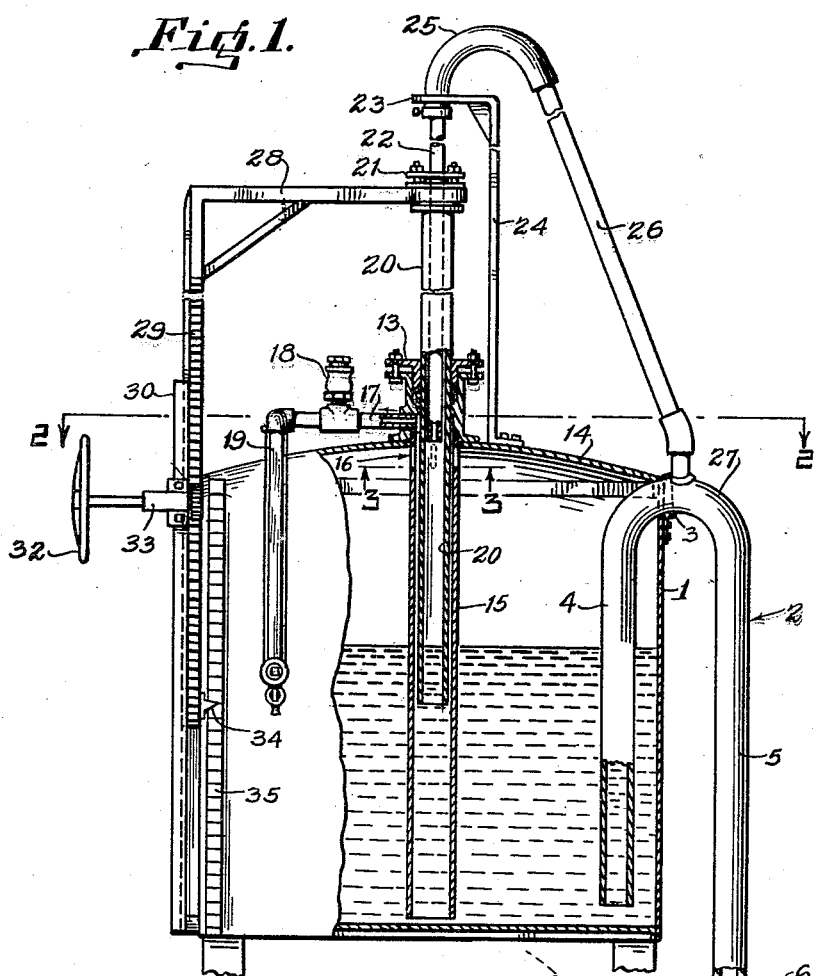
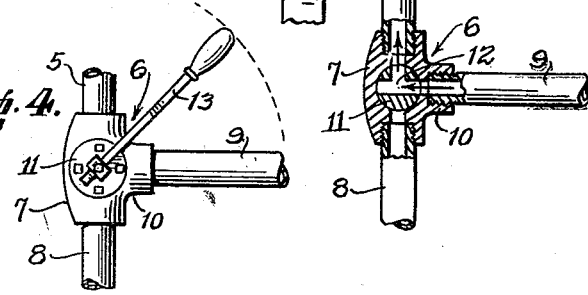

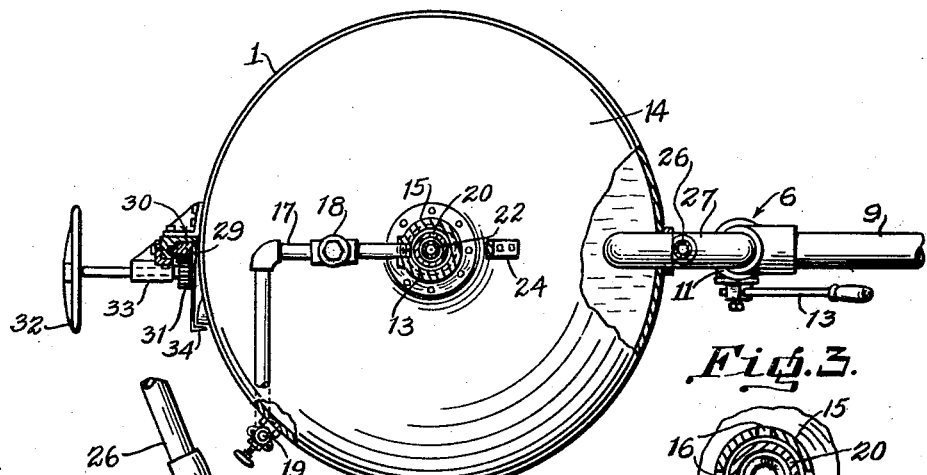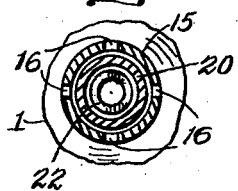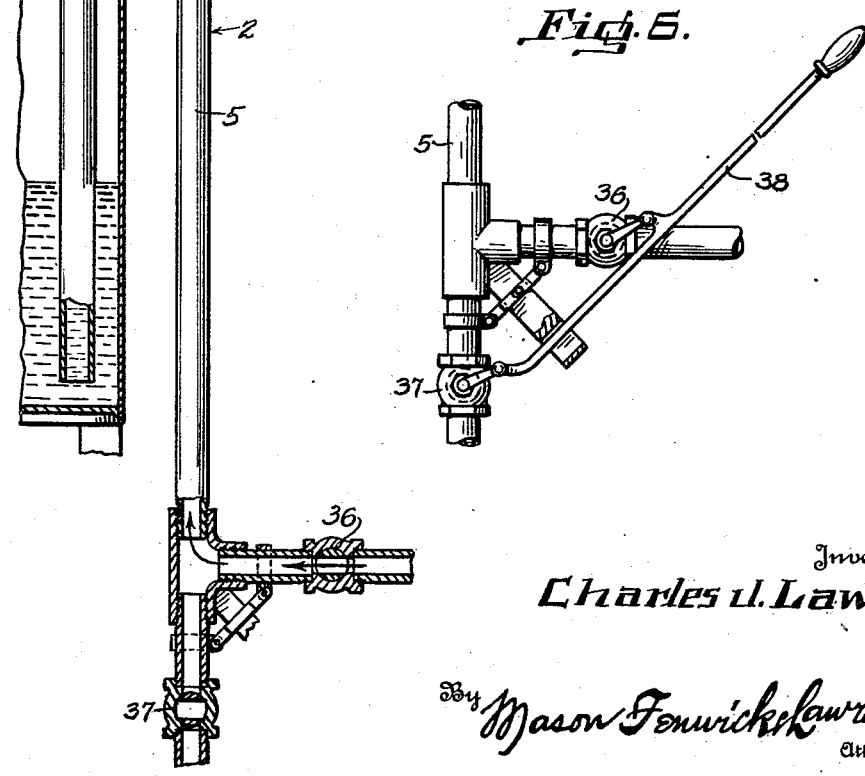

1,772,903

UNITED STATES PATENT OFFICE

CHARLES J. LAWSON, OF GREENVILLE, MISSISSIPPI

SIPHON MEASURING TANK

Application filed August 15, 1928. Serial No. 299,821.

The invention forming the subject matter of the present application is a liquid measuring apparatus of the siphon air-break type, and is an improvement on the apparatus disclosed in my U. S. Patent No. 1,673,690, June 12, 1928.

The main object of the invention is to increase the accuracy of measurement of devices of this type and to make them of greater simplicity and ruggedness.

Other objects of the invention will become apparent as the detailed description thereof proceeds.

In the drawings:

Fig. 1 is a side elevation of the apparatus with parts thereof broken away and shown in section;

Fig. 2 is a horizontal section taken on the line 2—2 of Fig. 1;

Fig. 3 is a horizontal section taken on the line 3—3 of Fig. 1;

Fig. 4 is a fragmentary elevation of valve mechanism shown in Fig. 1;

Fig. 5 is a fragmentary sectional elevation of a modified form of the device; and Fig. 6 is a fragmentary elevation of valve mechanism shown in Fig. 5.

Referring to Figs. 1 to 4, reference numeral 1 designates a measuring tank, having an inverted U-shaped siphon tube 2 extending through a water- and air-tight joint 3 into said tank. The inner leg 4 of said tube 2 has the end thereof extending closely adjacent to bottom of tank 1; and the outer leg 5 has a three-way valve 6 connected thereto at a point below the bottom of the tank 1.

The valve 6 comprises a T-shaped casing 7 screwthreaded by one of its arms to the lower end of the leg 5 of the siphon 2; and the opposite end of the casing 7 is screwthreaded to a discharge pipe 8. A feed pipe 9, connected to any suitable source of supply, has one end thereof screwthreaded to the remaining arm 10 of the valve 6.

The valve plug 11 provided with the T-shaped passageway 12 is rotatably mounted in the casing 7 and has a handle 13 secured to one end thereof to rotate the valve plug to any desired position. As will be apparent from Fig. 1, in which the valve is shown in tank filling position, the valve may be rotated either to fill the tank 1, or to discharge liquid from the tank 1 through the discharge pipe 8.

In order to control the quantity of liquid discharged from the tank 1 the latter is provided with a pipe supporting packing gland 13 secured to the top 14 of the tank at the center thereof. A surge pipe 15 extends downwardly from said gland 13 to a point near the bottom of the tank 1 and is provided at its upper end with a series of slots 16 (see Fig. 3) to allow air to escape from the upper end of the tank during the filling thereof.

Extending laterally from the gland 13 is an air pipe 17 connected to one end of an air-escape valve 18; and connected to the other end of valve 18 is a water gage 19 mounted on the outside of the tank 1 and having its lower end communicating with the interior of said tank.

The water gage 19 need not be extended throughout the length of tank 1, because the tank 1 must be filled before each measuring operation, and the gage 19 is only necessary near the top of tank to show that the latter is being filled. The air-escape valve 18 is necessary to permit the escape of air from the water gage 19 and from the top of tank 1 in order to prevent the formation of air pockets which would affect the accuracy of measurement of the device.

Slidably mounted in the gland 13 is an air-break measuring pipe 20, and this pipe 20 has a packing gland 21 at its upper end which forms an air tight slidable connection between pipe 20 and a fixed air pipe 22. The air pipe 22 has its upper end fixed to the top arm 23 of a bracket 24 which is suitably fixed on the top 14 of the tank 1; and the upper end of pipe 22 is connected to a bend 25 of piping 26 connected to the center of the bend 27 of the siphon 2.

The pipes 15, 20 and 22 are concentric with each other. The pipe 20 merely forms a telescopic continuation of pipe 22 in order to regulate the distance of the air-break controlling the measurement of liquid from the tank 1. The pipe 15 surrounds the pipe 20 and is intended to prevent the surging of liquid in the tank from affecting the measurement of liquid by the pipe 20.

In order to adjust the pipe 20 vertically within the tank 1 the gland 21 is connected to the arm 28 of a bracket having a rack arm 29 extending downwardly along the outside of the tank 1. The rack arm 29 is guided slidably in a guide 30 and is reciprocated in said guide by means of a pinion 31 operated by a handle 32 which is rotatably mounted in a bearing 33 suitably fixed on the guide 30.

Extending laterally from the lower end of the rack arm 29 is an indicator 34 which reads on a scale 35 conveniently fixed on the outside walls of the tank 1. As will be apparent from Fig. 1 when the handle 32 is rotated the pipe 20 will be adjusted up and down in the tank 1 to control the distance of its lower end relative to the top of the tank and thereby control the break to the top of the siphon 2.

The specific details of the packing elements of the glands 21 and 13 form no part of the present invention and are not described in detail herein.

The modification shown in Fig. 5 merely illustrates a form in which the siphon tube enters the top of the tank 1 instead of the side. In this form of the invention two one-way valves 36 and 37 are arranged in the inlet and discharge pipes, respectively, connected to the outside arm 5 of the siphon tube. These valves 36 and 37 are inter-controlled by means of a linkage 38 so that one is closed when the other is opened. The operation of these valves is substantially the same as that of the three-way valve shown in Fig. 1 and one form may be substituted for the other as desired.

The operation of the apparatus will be apparent to persons skilled in the art and need not be described in detail herein. The arrangement of the adjustable measuring or air-break pipe in the center of the tank is of the utmost importance, as this arrangement avoids inaccuracy of measurement when the tank 1 is tilted. The air-escape valve is of the usual check valve type which normally maintains the tank at atmospheric pressure, but closes the vent to prevent overflowing when the tank is full.

I claim:

1. A tank, an inverted U-shaped siphon having one leg inside and the other leg outside of said tank, means connected to said other leg to control the supply and discharge of liquid through said siphon to and from said tank, an air pipe fixed to the top of said tank at the center thereof, a pipe slidable through the top of said tank and over said air pipe toward and from the bottom of said tank, means for sliding said second pipe, and piping connecting one end of said air pipe to the bend of said siphon.

2. A tank, an inverted U-shaped siphon connected to the tank, means connected to said siphon to control the supply and discharge of liquid through said siphon to and from said tank, a telescopic tube having one part thereof fixed to the top of said tank and the other part slidable through the center of said top toward and from the bottom of said tank, means for sliding said other part over the first named part and through said top, and a pipe connecting the top of the fixed part of said telescopic tube to the bend of said siphon.

3. A tank, an inverted U-shaped siphon connected to the tank, means connected to said siphon to control the supply and discharge of liquid through said siphon to and from said tank, a packing gland fixed to the top of said tank at the center thereof, a pipe extending from said gland toward the bottom of said tank and having an air vent adjacent to the top of said tank, an air valve connected to said vent, a telescopic pipe having one part fixed to the top of said tank and having another part slidable through said gland concentrically with the first named pipe, and a pipe connecting the top of the fixed part of said telescopic tube to the bend of said siphon.

In testimony whereof I affix my signature.

CHARLES J. LAWSON.